(No Model.)
J. H. BUSTIN.
TWO WHEELED VEHICLE.
No. 283,698. Patented Aug. 21, 1883.
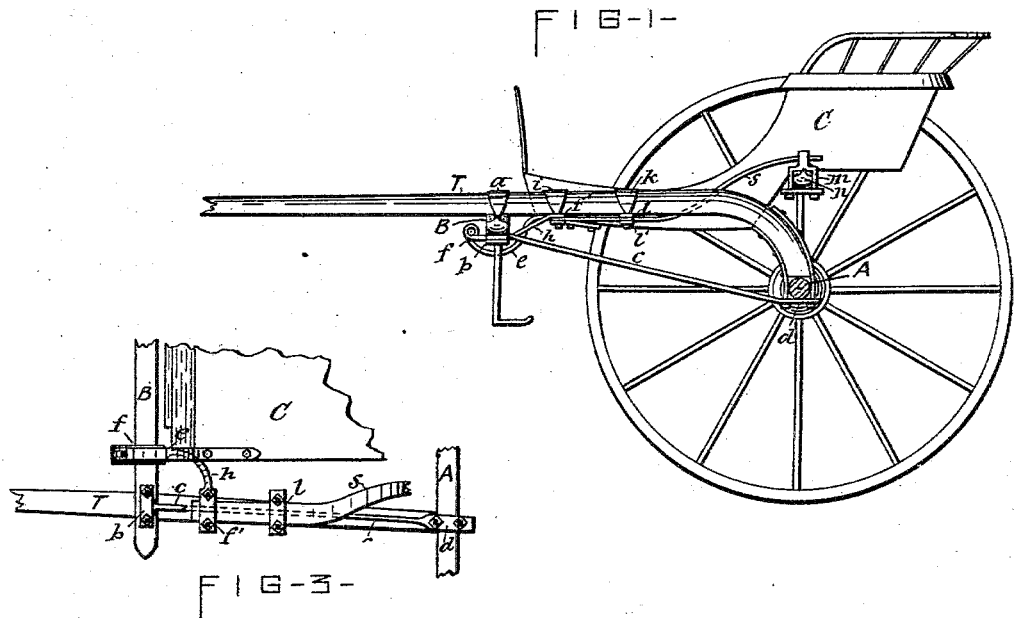
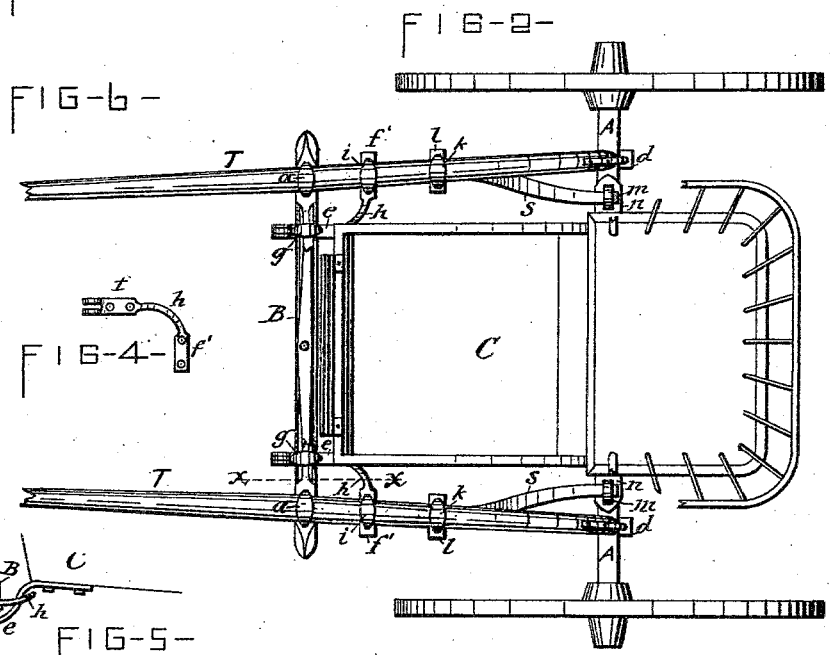
WITNESSES—
INVENTOR—

UNITED STATES PATENT OFFICE.

JOHN H. BUSTIN, OF SYRACUSE, NEW YORK, ASSIGNOR OF THREE-FOURTHS TO CHARLES H. DUELL, EMIL LAASS, AND GEORGE W. HEY, ALL OF SAME PLACE.

TWO-WHEELED VEHICLE.

SPECIFICATION forming part of Letters Patent No. 283,698, dated August 21, 1883.

Application filed May 24, 1883. (No model.)

*To all whom it may concern:*

Be it known that I, JOHN H. BUSTIN, of Syracuse, in the county of Onondaga, in the State of New York, have invented new and useful Improvements in Road-Carts, of which the following, taken in connection with the accompanying drawings, is a full, clear, and exact description.

This invention relates to that class of two-wheeled vehicles which are usually designated "English road-carts;" and it consists in an improved construction and combination of devices for elastically and adjustably supporting the body of said vehicle, and also in certain peculiarities in the details of construction, all as hereinafter more fully described, and set forth in the claims.

In the annexed drawings, Figure 1 is a side view of my improved road-cart. Fig. 2 is a plan view of the same, with portions of the seat broken away to better illustrate the underlying parts of the invention. Fig. 3 is an inverted plan view of the connection of the forward end of the body and spring with the thill, and of the connection of the draft bar and thill. Fig. 4 is a detail view of the lateral brace of the thill. Fig. 5 is a detail view taken on line $xx$, Fig. 2, and illustrating more fully the connection of the forward end of the body with the draft-bar; and Fig. 6 is an enlarged transverse section of the thill, illustrating the devices for adjustably attaching the spring to the thill without cutting away any material thereof, or otherwise impairing the rigidity of the same.

Similar letters of reference indicate corresponding parts.

A represents the axle of the vehicle, and T the thill or shafts, firmly connected to said axle in any suitable and well-known manner, and stayed by the draft-bar B, which I secure to the thill by laying it across the same, preferably on the under side thereof, and fastened by clips $a$, encompassing the thill, and a clip-bar, $b$, extended across the under side of the draft-bar and clamped in position by nuts on the ends of the clip, protruding through the clip-bar in the usual manner. Said mode of connecting the draft-bar with the thill obviates the expenditure of time and the weakening of the thills entailed by the usual method of framing said parts together. The thill and draft-bar are further sustained by a brace, $c$, extended from the draft-bar to the axle and integral with both the clip-bar $b$ aforesaid and the clip-bar $d$, by which the thill is secured to the axle.

C denotes the body of the vehicle. The forward end thereof is hung vertically vibratory on the draft-bar B by a goose-neck, $e$, firmly secured to the body and extended around the under side of the draft-bar, and hinged to a forward extension of the clip-bar $f$ of the clip $g$, which embraces the draft-bar and completes the aforesaid connection of the body with the draft-bar.

In order to avoid the necessity of boring through the thill and draft-bar, or otherwise weakening the same, I form the usual lateral brace or corner-brace, $h$, with clip-bars $f$ and $f'$ at its two extremities, as shown in Fig. 4 of the drawings, the clip-bar $f$ being connected with the clip $g$ on the draft-bar, and having the forward extension, on which the goose-neck $e$ is hinged in the manner before set forth, the clip-bar $f'$, on the opposite end of the brace $h$, passing under the thill back of the draft-bar, and forming a part of the attachment of the side springs, as hereinafter described.

$ss$ denote the aforesaid springs, consisting of spring leaves or bars arranged at opposite sides of the body, and connected at their forward end to the thill intermediately between the draft-bar and axle, so that the said spring and its support can be shifted longitudinally on the thills, and thus made to carry the body with the desired elasticity and in the required position over the axle. The aforesaid connection of the springs is made directly with the thills, and consists of a clip, $i$, embracing the thills and clamped thereon by the clip-bar $f'$, hereinbefore described, and nuts on the ends of the clip, in the usual manner, the forward end of the spring $s$ being clamped between the clip-bar $f'$ and under side of the thill. Another clip, $k$, is applied to the thill back of the clip $i$, and has connected to it duplex clip-bars $ll'$, between which the spring $s$ passes, and thus receives its support intermediately between the two extremities, the rear end of the spring being connected by a suitable coupling, m, with a cross-bar, n, which is extended across the under side of the rear or main portion of the body, which latter thus receives its elastic support.

By loosening the clip-bars of the clips i and k the springs can be slipped endwise to carry the support of the body backward or forward and properly balance the same over the axle, the clip-bars being refastened after the body has been adjusted, as aforesaid. The elasticity of the springs can be adjusted by setting the clip k back or forward on the thills, and thus diminishing or increasing the length of the vibrating end of the spring.

It will be observed that all of the described attachments are of such a nature as to avoid labor of framing and the weakening of parts by cutting away material.

What I claim as my invention, and desire to secure by Letters Patent, is—

1. In a two-wheeled vehicle, the body supported on the free end of rearwardly-projecting side springs, adjustably connected at their forward end to the thills, whereby the springs can be shifted to carry the support of the body back or forward of the axle, substantially as and for the purpose set forth.

2. In a two-wheeled vehicle, the combination, with the thills, of rearwardly projecting springs connected at their forward end to the thill by clips embracing the same, and duplex clip-bars, holding between them the spring, and the body, supported by the free end of said springs, substantially as described and shown.

3. In combination with the body, thill, and draft-bar, the corner-brace, terminating with clip-bars under the thill and draft-bar, and connected therewith by clips embracing said parts, and a goose-neck projecting from the front of the body and hinged on the forward end of the corner-brace, substantially as described and shown.

In testimony whereof I have hereunto signed my name and affixed my seal, in the presence of two attesting witnesses, at Syracuse, in the county of Onondaga, in the State of New York, this 26th day of April, 1883.

JOHN H. BUSTIN. [L. S.]

Witnesses:
 FREDERICK H. GIBBS,
 WILLIAM C. RAYMOND.